Dec. 19, 1944.  A. HAMMERSTEIN  2,365,467
IMPLEMENT STAND
Filed Sept. 22, 1942
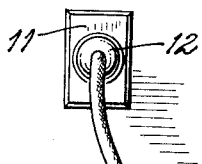
Fig.1.
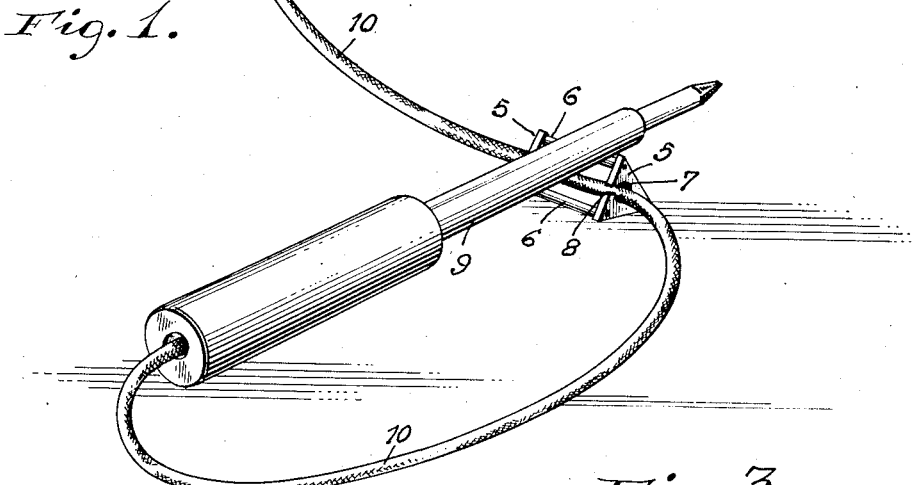
Fig.3.
Fig.2.
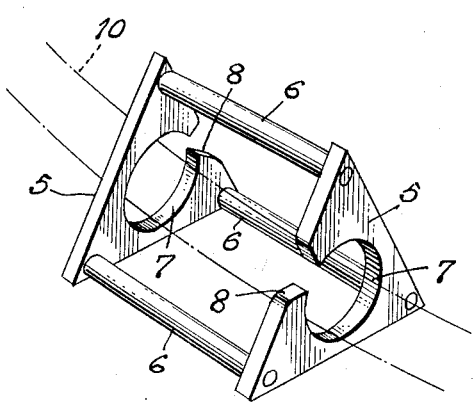
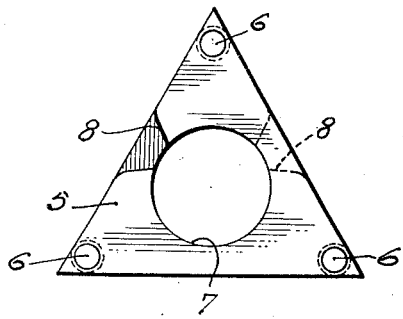
INVENTOR.
ARTHUR HAMMERSTEIN
BY
ATTORNEY

UNITED STATES PATENT OFFICE 2,365,467

IMPLEMENT STAND

Arthur Hammerstein, Palatine, Ill.

Application September 22, 1942, Serial No. 459,250

5 Claims. (Cl. 219—21)

The invention relates to implement stands and more particularly to stands for implements such as electric soldering irons, electric hair curling irons, and the like, and has for its object to provide a novel stand whereby the implement is supported during the heating thereof by the electric current and during periods between use while in a heated condition.

The invention contemplates further a novel stand of the indicated type which is combined in associated relation with the implement so as to be always available for use when required, and which, in addition to its other functions, may serve as a rest for certain types of electric implements, such as electric soldering irons, during use thereof.

Other objects of the invention will appear from the description hereinafter and the features of novelty thereof will be pointed out in the claims.

In the accompanying drawing, which illustrates an example of the invention without defining its limits, Fig. 1 is a perspective view showing the novel stand in associated relation with an electric soldering iron and serving as a rest therefor;

Fig. 2 is an enlarged perspective view of the novel stand, and

Fig. 3 is an end view thereof.

The novel stand may be made of any suitable material such as metal, and comprises polygonal end members 5 and rods 6. The latter extend between the end members 5 and have their opposite ends attached thereto in any convenient manner. The rods 6 may be made of any suitable material such as metal and may be of any cross-sectional shape, and in any case serve to fix the end members 5 in spaced registering relation with each other and to constitute rests for the implements as will appear more fully hereinafter.

In the illustrated example, the end members 5 are of triangular shape, and the rods 6 are cylindrical in form, it being understood that the shape of the end members 5 and the form of the rods 6 may be varied without effecting the efficiency of the device for its intended purposes.

As shown in the drawing, the end members 5 are provided with preferably, though not necessarily, circular openings 7 located in axial registry with each other. The end members 5 further include slots 8 which terminate in an edge of said members 5 and communicate with the openings 7. The slots 8 converge inwardly toward the openings 7 or are otherwise formed to provide for transverse entry into the same and to prevent ready transverse removal of an electric cord or the like from said openings 7. The slots 8 of the respective end members 5 may be located in registry with each other, or as is preferred may be relatively staggered, for instance by being formed in different side edges of the respective end members 5, for instance, as shown in Figs. 2 and 3.

In combining the novel stand in operative association, for instance with an electric soldering iron 9, the cord 10 whereby the iron 9 is connected with a conventional electric outlet 11, is forced inwardly through the slots 8 into the openings 7. When thus combined with the implement, the novel stand is freely slidable on the cord 10 and is held against unintentional separation therefrom by the relatively reduced inner ends of said slots 8. The soldering iron 9 or equivalent implement and the customary connecting plug 12 prevent the stand from being slidably removed from the cord 10.

As a result the novel stand is maintained in operative association with the soldering iron 9 or equivalent implement, so as to be readily available for use whenever required.

During the period of heating the soldering iron 9, or equivalent implement, the stand is adjusted lengthwise of the cord 10 and placed upon a table or other support in position to enable the soldering iron 9 or equivalent implement to be placed upon said table or other support with its hot or operative end resting upon one of the rods 6. The implement may be correspondingly supported by the stand in the intervals between use of said implement. The hot or operative end of the latter will thereby be supported out of contact with said table or other support whereby injury to the latter and even fire is positively and effectively prevented.

During use of the soldering iron 9 or other implement the stand may be used as a rest for the soldering iron or other implement to steady the manipulation thereof by the operator. In such case the stand will be positioned in proximity to the work, and the soldering iron 9 or other implement will be placed upon one of the rods 6 to steady and guide the manipulation of the soldering iron or other implement in the performance of its operative functions.

Prolonged search for a suitable support for the hot implement each time such support is required is avoided and misplacement and loss of the novel stand is prevented. With the novel arrangement the novel stand is always instantly available at all times.

While the novel stand is illustrated and described in association with an electric soldering iron, this is not to be construed as a restriction of its field of usefulness. Obviously the novel stand may be used with equal efficiency with other types of electric implements such as for instance electric curling irons, etc.

Various changes in the specific form shown and described may be made within the scope of the claims without departing from the spirit of the invention.

I claim:

1. A stand of the kind described comprising polygonal end members, and a plurality of spacing members each having opposite ends secured to said end members respectively for fixing the same in spaced registering relation with each other, said end members being provided with outwardly open slotted openings for accommodating the electric cord of an electrically-heated implement whereby said stand is slidably mounted on said cord and capable of being selectively set upon a surface, said spacing members thereupon constituting supporting rests for the heated portion of said implement to maintain it out of contact with said surface.

2. A stand of the kind described comprising triangular end members, and rods secured thereto for fixing said end members in spaced relation with each other, said end members being provided with openings for accommodating the electric cord of an electrically heated implement whereby said stand is slidably mounted on said cord, and with outwardly open slots leading to said openings through which said cord may be introduced into the latter, and said rods constituting supporting rests for the heated portion of said implement.

3. A stand of the kind described comprising triangular end members, and rods secured thereto for fixing said end members in spaced relation with each other, said end members being provided with openings in axial registry with each other for accommodating the electric cord of an electrically heated implement whereby said stand is slidably mounted on said cord, and with outwardly open reduced slots leading to said openings through which said cord may be introduced into the latter, and said rods constituting supporting rests for the heated portion of said implement.

4. A stand of the kind described comprising triangular end members, and rods secured thereto for fixing said end members in spaced relation with each other, said end members being provided with openings in axial registry with each other for accommodating the electric cord of an electrically heated implement whereby said stand is slidably mounted on said cord, and with outwardly open and inwardly converging slots leading to said openings through which said cord may be introduced into the latter, and said rods constituting supporting rests for the heated portion of the implement.

5. A stand of the kind described comprising triangular end members, and rods secured thereto for fixing said end members in spaced relation with each other, said end members being provided with openings in axial registry with each other for accommodating the electric cord of an electrically heated implement whereby said stand is slidably mounted on said cord, and with outwardly open and inwardly converging slots located out of registry with each other and leading to said openings through which said cord may be introduced into the latter, and said rods constituting supporting rests for the heated portion of the implement.

ARTHUR HAMMERSTEIN.